(12) United States Patent
Kang

(10) Patent No.: US 11,046,387 B2
(45) Date of Patent: Jun. 29, 2021

(54) BICYCLE DRIVING DEVICE HAVING INCREASED TORQUE

(71) Applicant: Kyung Taek Kang, Surrey (CA)

(72) Inventor: Kyung Taek Kang, Surrey (CA)

(*) Notice: Subject to any disclaimer, the term of this patent is extended or adjusted under 35 U.S.C. 154(b) by 0 days.

(21) Appl. No.: 16/772,773

(22) PCT Filed: Jan. 2, 2019

(86) PCT No.: PCT/KR2019/001455
§ 371 (c)(1),
(2) Date: Jun. 13, 2020

(87) PCT Pub. No.: WO2019/164158
PCT Pub. Date: Aug. 29, 2019

(65) Prior Publication Data
US 2021/0094653 A1    Apr. 1, 2021

(30) Foreign Application Priority Data

Feb. 20, 2018 (KR) .......... 10-2018-0019605
Oct. 18, 2018 (KR) .......... 10-2018-0124119

(51) Int. Cl.
*B62M 3/06* (2006.01)
*B62M 3/08* (2006.01)
(Continued)

(52) U.S. Cl.
CPC ............ *B62M 3/06* (2013.01); *B62M 3/08* (2013.01); *B62M 9/00* (2013.01); *F16H 7/06* (2013.01); *B62M 2009/005* (2013.01)

(58) Field of Classification Search
CPC ............ Y10T 74/2167; Y10T 74/2165; Y10T 74/2164; B62M 1/36; B62M 2003/006; B62M 3/06; B62M 3/08
(Continued)

(56) References Cited

U.S. PATENT DOCUMENTS 96,208 A * 10/1869 Dayton ............... B62M 1/28
                                                        280/236
3,888,136 A * 6/1975 Lapeyre ............... B62M 3/02
                                                        74/594.1
(Continued)

FOREIGN PATENT DOCUMENTS

CN      102085898 B     4/2004
CN      2649474 Y       10/2004
(Continued)

*Primary Examiner* — Henry Y Liu
(74) *Attorney, Agent, or Firm* — ByungJoo Park

(57) ABSTRACT

The present invention relates to a bicycle driving device having increased torque, the device moving, to the front thereof, the center of a rotational track in a state in which an overall pedaling track (distance) does not increase, thereby removing the top dead center and enabling force to be strongly transmitted to a crankshaft during pedaling. According to the present invention, a rotational track of a pedal is moved to the front thereof such that when the pedal is in a forward position, the pedal is separated far away from the crankshaft so as to enable a strong force to be transmitted to the crankshaft by using the principle of the lever, and thus rotational torque can be increased.

4 Claims, 13 Drawing Sheets

Figure 1:
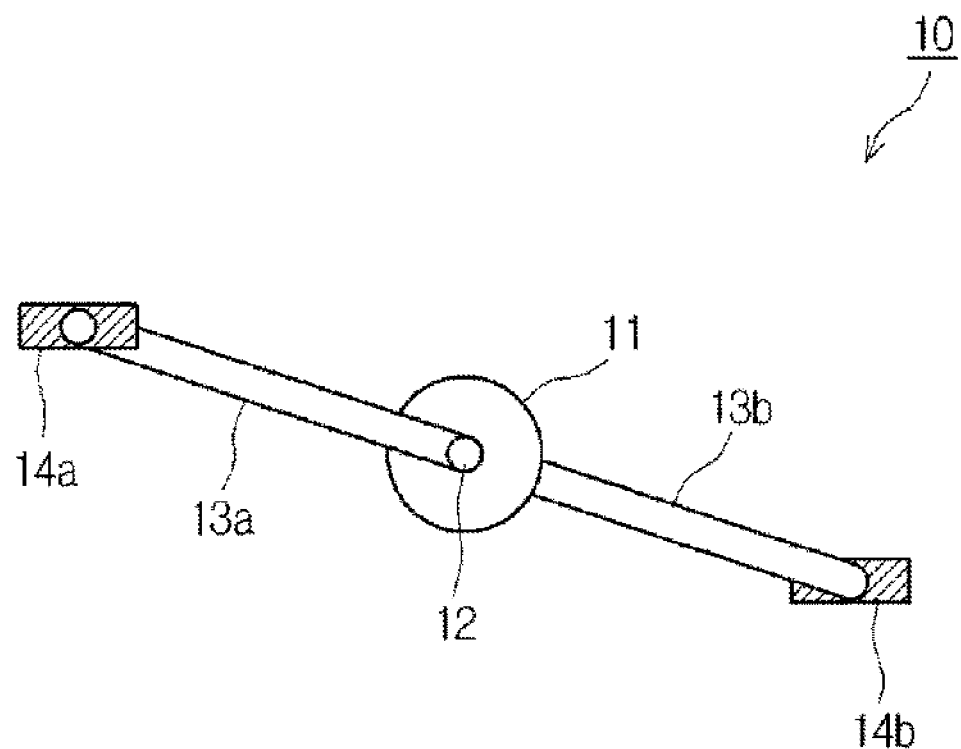

(51) Int. Cl.
*B62M 9/00* (2006.01)
*F16H 7/06* (2006.01)

(58) Field of Classification Search
USPC .................................. 280/261, 260, 259
See application file for complete search history.

(56) References Cited

U.S. PATENT DOCUMENTS

| | | | | |
|---|---|---|---|---|
| 3,908,474 | A * | 9/1975 | Cole | B62M 15/00 74/117 |
| 4,159,652 | A * | 7/1979 | Trammell, Jr. | B62M 1/26 280/259 |
| 4,281,845 | A * | 8/1981 | Brown | B62M 3/06 280/236 |
| 4,560,182 | A * | 12/1985 | Yamaguchi | B62M 1/36 280/257 |
| 4,772,252 | A * | 9/1988 | Bona | B62M 1/36 474/112 |
| 4,816,009 | A * | 3/1989 | Philipp | B62M 1/36 280/236 |
| 4,882,945 | A * | 11/1989 | Trevizo | B62M 3/04 74/594.3 |
| 4,898,047 | A * | 2/1990 | Cropek | B62M 1/10 280/256 |
| 5,095,772 | A * | 3/1992 | Fortson | B62M 3/04 74/594.1 |
| 5,142,937 | A * | 9/1992 | Takahara | B62M 11/04 74/437 |
| 5,172,926 | A * | 12/1992 | Mannino | B62M 1/36 280/252 |
| 5,207,119 | A * | 5/1993 | Garneau | B62M 3/04 475/331 |
| 5,879,017 | A * | 3/1999 | Debruin | B62M 1/36 280/259 |
| 5,899,119 | A * | 5/1999 | Coment | B62M 3/00 74/594.1 |
| 6,085,613 | A * | 7/2000 | Niculescu | B62M 1/36 280/259 |
| 6,152,471 | A * | 11/2000 | Kang | B62M 3/04 280/261 |
| 6,663,127 | B2 * | 12/2003 | Miller | B62M 1/26 280/252 |
| 6,830,259 | B2 * | 12/2004 | Jakovljevic | B62M 1/36 280/259 |
| 6,840,136 | B1 * | 1/2005 | Jones | B62M 1/36 280/259 |
| 7,007,570 | B2 * | 3/2006 | Gayoh | B62M 3/06 280/236 |
| 7,988,169 | B2 * | 8/2011 | Baek | B62K 3/002 280/221 |
| 8,157,281 | B2 * | 4/2012 | Wang | B62M 3/06 280/256 |
| 8,602,434 | B2 * | 12/2013 | Woods | B62M 1/36 280/261 |
| 8,628,102 | B2 * | 1/2014 | McClure | B62M 1/26 280/259 |
| 10,384,097 | B2 * | 8/2019 | Kaan | A63B 69/16 |
| 10,710,673 | B2 * | 7/2020 | Jacques | B62M 9/02 |
| 10,850,800 | B2 * | 12/2020 | Schmertz | B62M 1/30 |
| 10,858,065 | B1 * | 12/2020 | Kipnis | B62M 1/28 |
| 2003/0040404 | A1 * | 2/2003 | Maresh | A63B 22/0015 482/51 |
| 2010/0130331 | A1 * | 5/2010 | Hu | B62M 3/08 482/57 |
| 2011/0049830 | A1 * | 3/2011 | Hung | B62M 1/26 280/256 |
| 2015/0329171 | A1 * | 11/2015 | Jacques | B62M 3/08 475/182 |

FOREIGN PATENT DOCUMENTS

| | | |
|---|---|---|
| JP | 2008-201397 | 9/2008 |
| KR | 10-0953156 B1 | 4/2010 |
| KR | 10-2010-0117028 A | 11/2010 |
| KR | 10-2014-0011222 A | 1/2014 |
| KR | 10-1705496 B1 | 2/2017 |
| TW | M498716 U | 4/2015 |

* cited by examiner

BICYCLE DRIVING DEVICE HAVING INCREASED TORQUE

CROSS-REFERENCE TO RELATED APPLICATIONS

This application is a National Phase of the International Application No. PCT/KR2019/001455 filed on Feb. 1, 2019, which is based on Korean Application No. 10-2018-0019605 filed on Feb. 20, 2018 (now Korean Registered Patent. No. 10-1912-5570000) and Korean Application No. 10-2018-0124119 filed on Oct. 18, 2018 (now Korean Registered Patent. No. 10-1931-4770000). The applications are incorporated herein by reference.

TECHNICAL FIELD

This invention is about a bicycle driving device having increased torque that can deliver the energy of the rider more efficiently and provide more torque and driving force with applying less effort by using the lever principle.

BACKGROUND TECHNOLOGY

Figure 2:
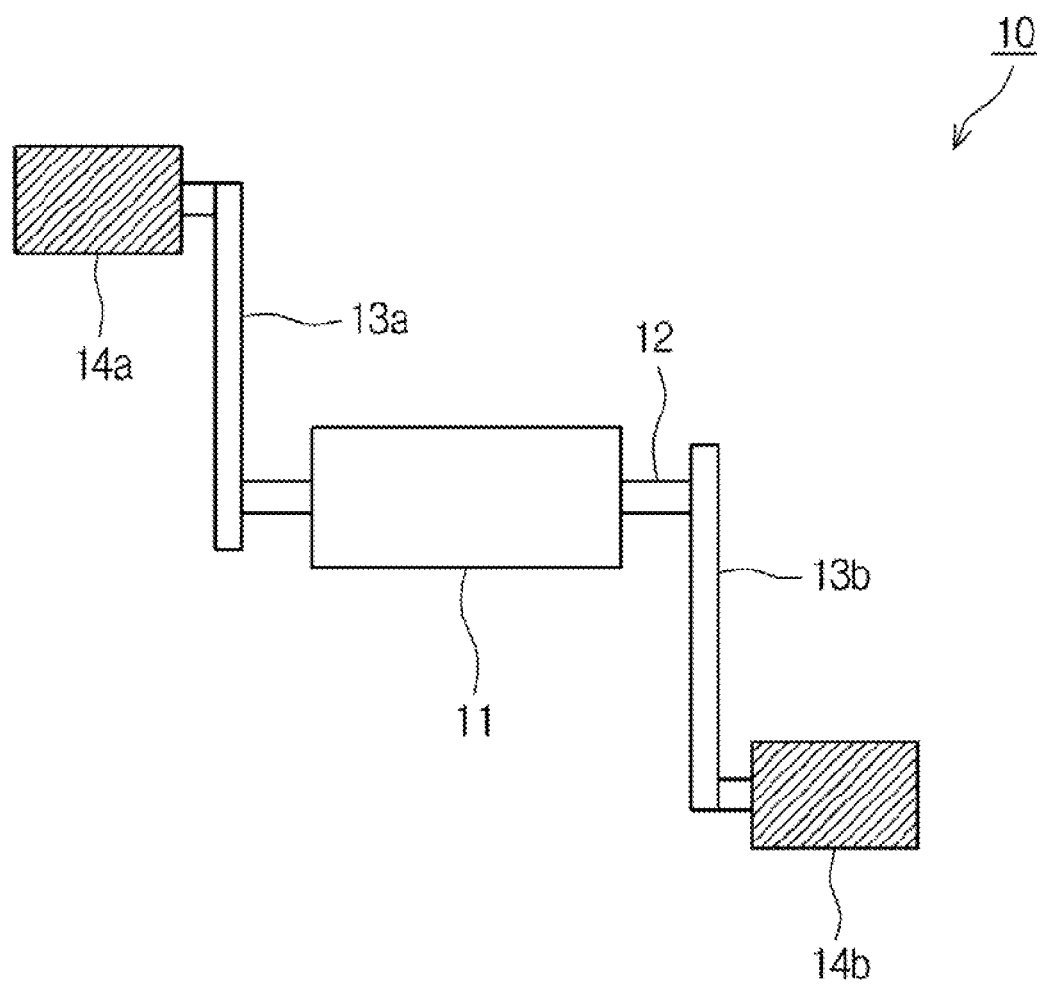

The conventional drivetrain system of bicycle (10) consists of a frame (11), crankshaft (12) rotating on the frame (11), crank arms (13a, 13b) connected to the sides of the crankshaft (12), and pedals (14a, 14b) connected to the tips of crank arms (13a, 13b), as seen in the FIG. 1. The FIG. 2 shows the conventional drivetrain (10) in a different angle.

Figure 3:
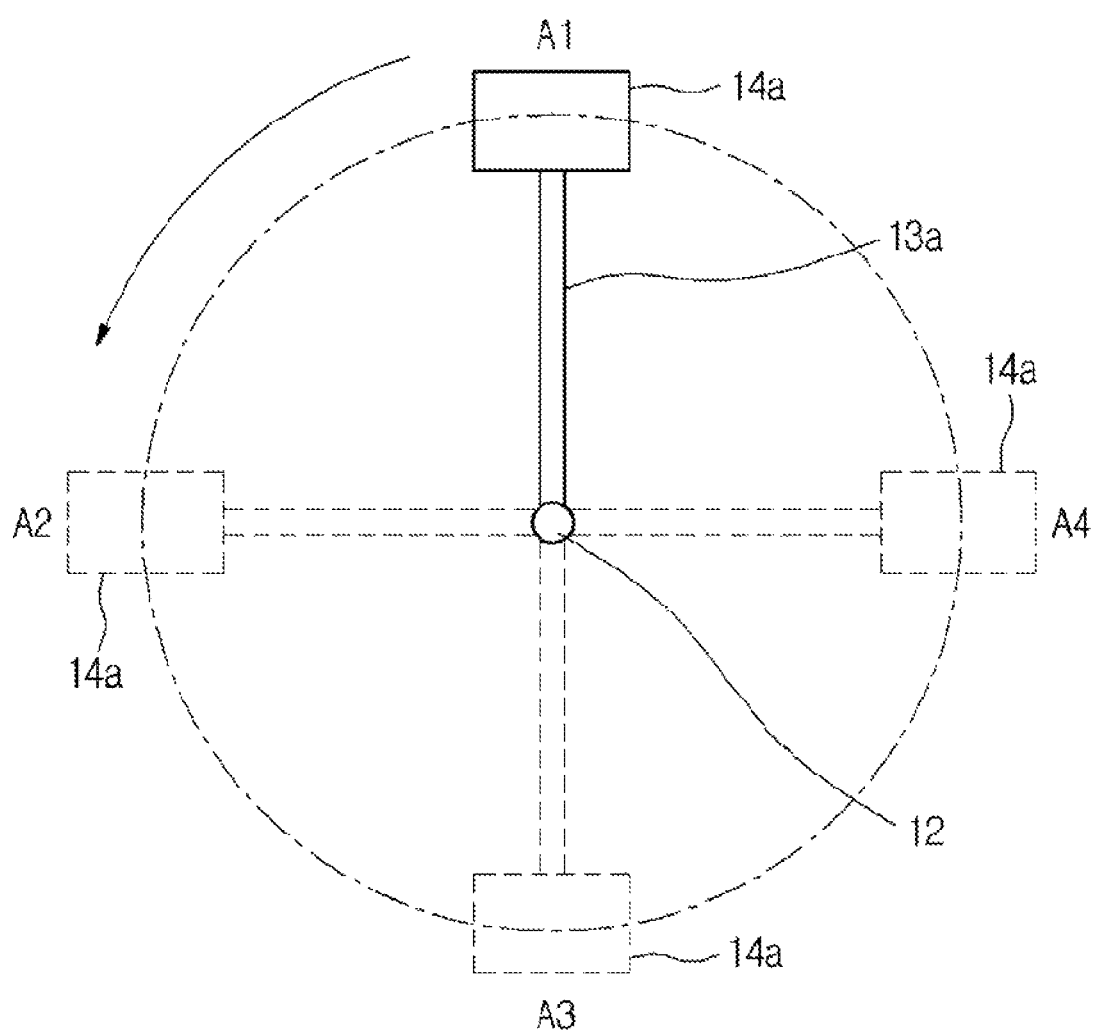

The left pedal (14a) rotates counter-clockwise from the crankshaft (12) which is the pivot, as seen in the FIG. 3. When the left pedal (14a) is positioned forwards (from the point A1 to A3), the rider can exert the most force to the crankshaft (12) with his left leg. When the left pedal (14a) is at A2, the most force can be exerted by the lever principle. When the left pedal(14a) is positioned backwards (the point from A3 to A1), the rider cannot exert force. When the left pedal (14a) is positioned backwards, the right pedal is positioned forwarded, so that the rider can exert force to the crankshaft (12) with the right leg.

The longer the crank arms (13a, 13b) are, the more force can be exerted to the crankshaft (12) However, the length of the crank arms (13a, 13b) is limited and standardized due to the length of human legs.

On the one hand, when the left pedal (14a) is positioned at A2 seen in the FIG. 3 and the rider exerts force toward the ground, the force is delivered to the crankshaft (12), making it rotate. When the left pedal is positioned at A1 and the rider exerts force toward the ground, it is impossible to make the crankshaft (12) rotate.

On the other hand, when the left pedal (14a) rotates counter-clockwise, if force is exerted perpendicularly (F), the force of F*sin θ is delivered to the crankshaft (12) as rotating power from the point of A1. At this point, the force is exerted horizontally as F*cos θ to the crankshaft, so that there is power loss.

CONTENT OF THE INVENTION

Object Task to Solve

The purpose of this invention provides a new drivetrain system of bicycle that can generate more driving force with exerting more power to the crankshaft by using extended crank arms that make the pedal's position more forwarded, using the lever principle.

Furthermore, this invention provides a new drivetrain system that enables to increase torque with minimizing the loss of energy by moving the trajectory of the pedal forward, even though the pedal is at the top dead center.

Also, this invention provides the same volume of trajectory of the pedal, so that it provides more torque without causing any discomfort to the rider.

Methods to Solve the Task

In order to achieve the above object, On the one hand, a bicycle driving device having increased torque comprising:

a frontal crankshaft (120) rotatably coupled to a frame (110);

a frontal sprocket (130) coupled to the one side of the crank shaft (120), wherein the crankshaft (120) rotates together;

a primary crank arm (131) positioned outside of said frontal sprocket (130), and coupled to one side of the crank shaft (120) to rotate together when the crank shaft (120) rotates;

a primary fixed sprocket (141) coupled via the frame (110) and a holding arm part (1411), is located between the frontal sprocket (130) and the primary crank arm (131), has a primary hole (1412) in the central part where the crankshaft (120) is inserted and rotates, and is fixed even when the crankshaft (120) rotates;

a primary rotating sprocket (142) rotatably coupled to an end of the primary crank arm (131) and having teeth formed at the 1:1 ratio with the primary fixed sprocket (141);

a primary auxiliary crank arm (151) rotatably coupled to an end of the primary crank arm (131) and fixed to the primary rotating sprocket (142) to rotate together;

a primary power transmission part (161) connecting the primary fixed sprocket (141) and the primary rotating sprocket (142) to transmit power;

a secondary crank arm (132) coupled to the other end of the crankshaft (120) and rotating together when the crankshaft (120) rotates;

a secondary fixed sprocket (143) coupled to the frame (110) with the secondary hole (1432) in the central part that does not rotate while the crankshaft (120) penetrated through the secondary hole (1432) and rotates;

a secondary rotating sprocket (144) rotatably coupled to an end of the secondary crank arm (132) and having teeth formed at 1:1 ratio with the secondary fixed sprocket (143);

a secondary auxiliary crank arm (152) rotatably coupled to an end of the secondary crank arm (132) and fixed to the secondary spinning sprocket (144) to rotate together; and a secondary power transmission part (162) for transmitting power by connecting the second fixed sprocket (143) and the second rotating sprocket (144).

On the other hand, the invention of a bicycle driving device having increased torque comprising:

a crankshaft (220) rotatably coupled through the central part of the socket (210);

a frontal sprocket (230) including a frontal sprocket hole (233) formed at a center thereof so that one side of the socket (210) can penetrate and not contact with the socket (210);

a primary crank arm (231) positioned outside the frontal sprocket (230) and coupled to one side of the crankshaft (220) to rotate together when the crank shaft (220) rotates;

a bridge (2311) connecting the primary crank arm (231) and the frontal sprocket 230 so that a space (2312) is formed;

a primary fixed sprocket (241) fixed to the one side of the socket (210), is located between the frontal sprocket (230) and the primary crank arm (231), that has a primary hole (2412) in the central part where the crank shaft (220) is penetrating, and is fixed even when the crankshaft (220) rotates;

a primary rotating sprocket (242) rotatably coupled to an end of the primary crank arm (231) and having teeth formed at a ratio of 1:1 ratio with the primary fixed sprocket (241);

a primary auxiliary crank arm (251) rotatably coupled to an end of the primary crank arm and fixed to the primary rotating sprocket (242) to rotate together;

a primary power transmission part (261) which transmits power by connecting the primary fixed sprocket (241) and the primary rotating sprocket (242) through the space (2312);

a secondary crank arm (232) coupled to the other end of the crankshaft (220) rotating together when the crankshaft (220) rotates;

a secondary fixed sprocket (243) fixedly coupled to the socket (210) with secondary hole (2432) in the central part that does not rotate while the crankshaft (220) penetrated though the secondary hole(2432), and rotates;

a secondary rotating sprocket 244 rotatably coupled to an end of the secondary crank arm (232) and having teeth formed at a ratio of 1:1 with the secondary fixed sprocket (243);

a secondary auxiliary crank arm (252) rotatably coupled to an end of the secondary crank arm (232) and fixed to the secondary rotating sprocket (244) to rotate together; and a secondary power transmission part (262) for transmitting power by connecting the secondary fixed sprocket (243) and the secondary rotating sprocket (244).

Effect of the Invention

This invention can bring the effect of increasing torque to the crankshaft with the same amount of force by extending the frontal trajectory of the pedal, using the lever principle to compare with the conventional bicycle drivetrain system.

Furthermore, this invention can provide the effect of delivering increased torque to the crankshaft with minimizing the loss of energy, even though the pedal is at the top dead center by moving the trajectory of the pedal forward.

And yet, the volume of the trajectory of the pedal is same as that of the conventional drivetrain system, so that it enables to use a bigger chain wheel, increasing driving speed.

BRIEF EXPLANATIONS ON THE FIGURES

FIG. 1. provides the side-view of the conventional drivetrain system.

FIG. 2 provides the birds eye view of the conventional drivetrain system.

FIG. 3 provides the view of the trajectory of the left pedal of the conventional drivetrain system.

Figure 4:
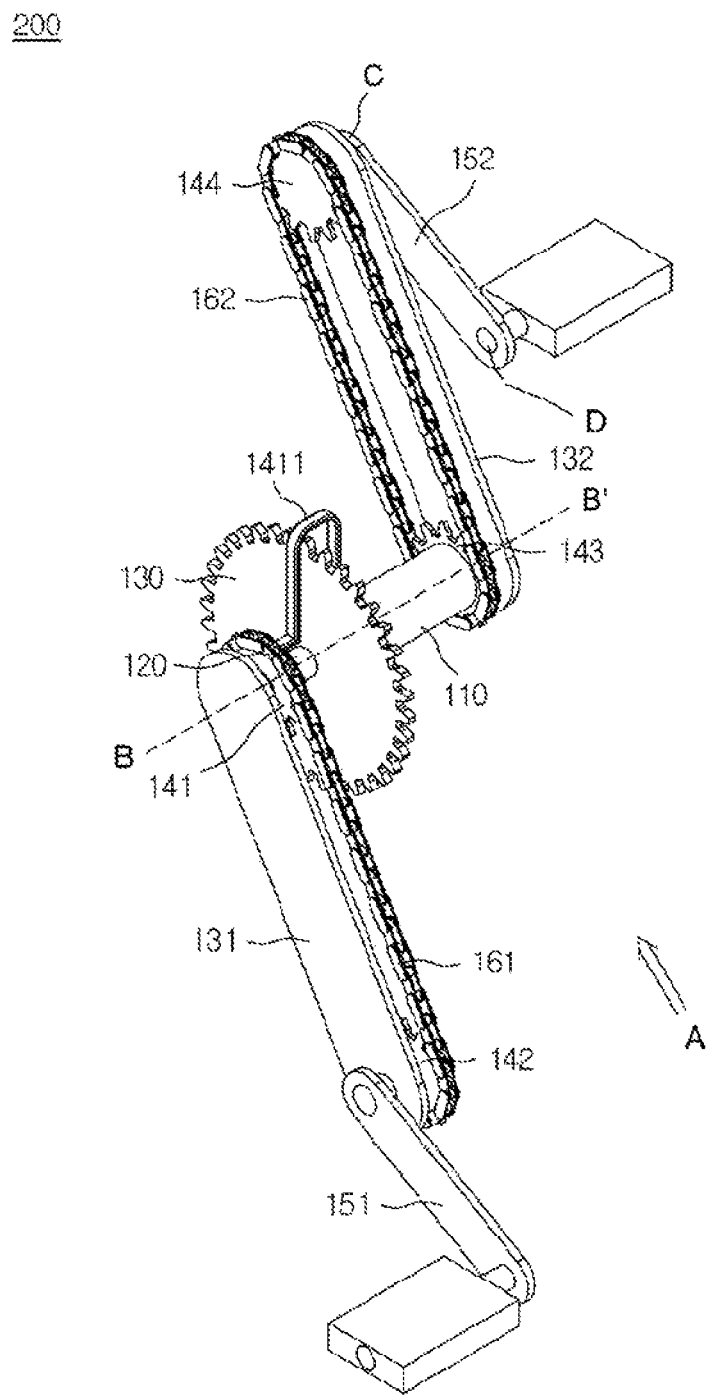

FIG. 4 provides the diagonal view of the first example of the invention of a bicycle driving device having increased torque.

Figure 5:
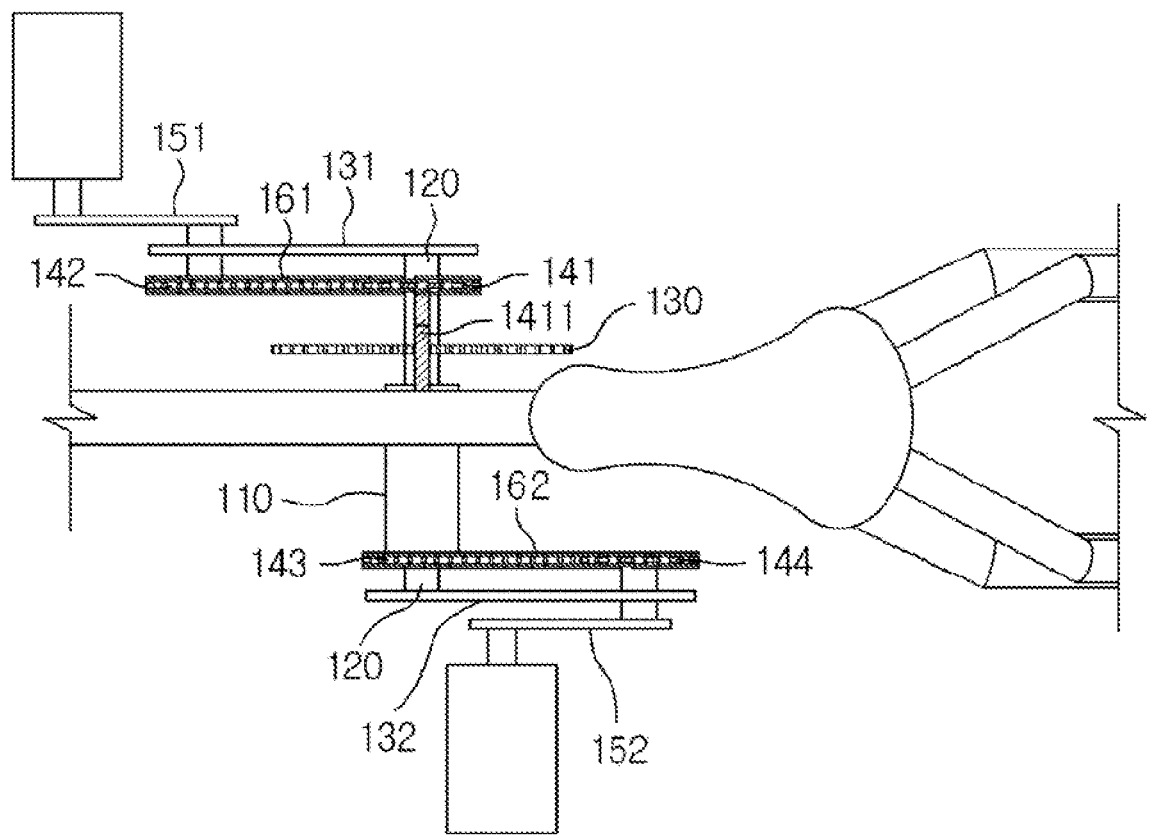

FIG. 5 provides the birds eye view of the bicycle driving device having increased torque installed on a bicycle frame.

Figure 6:
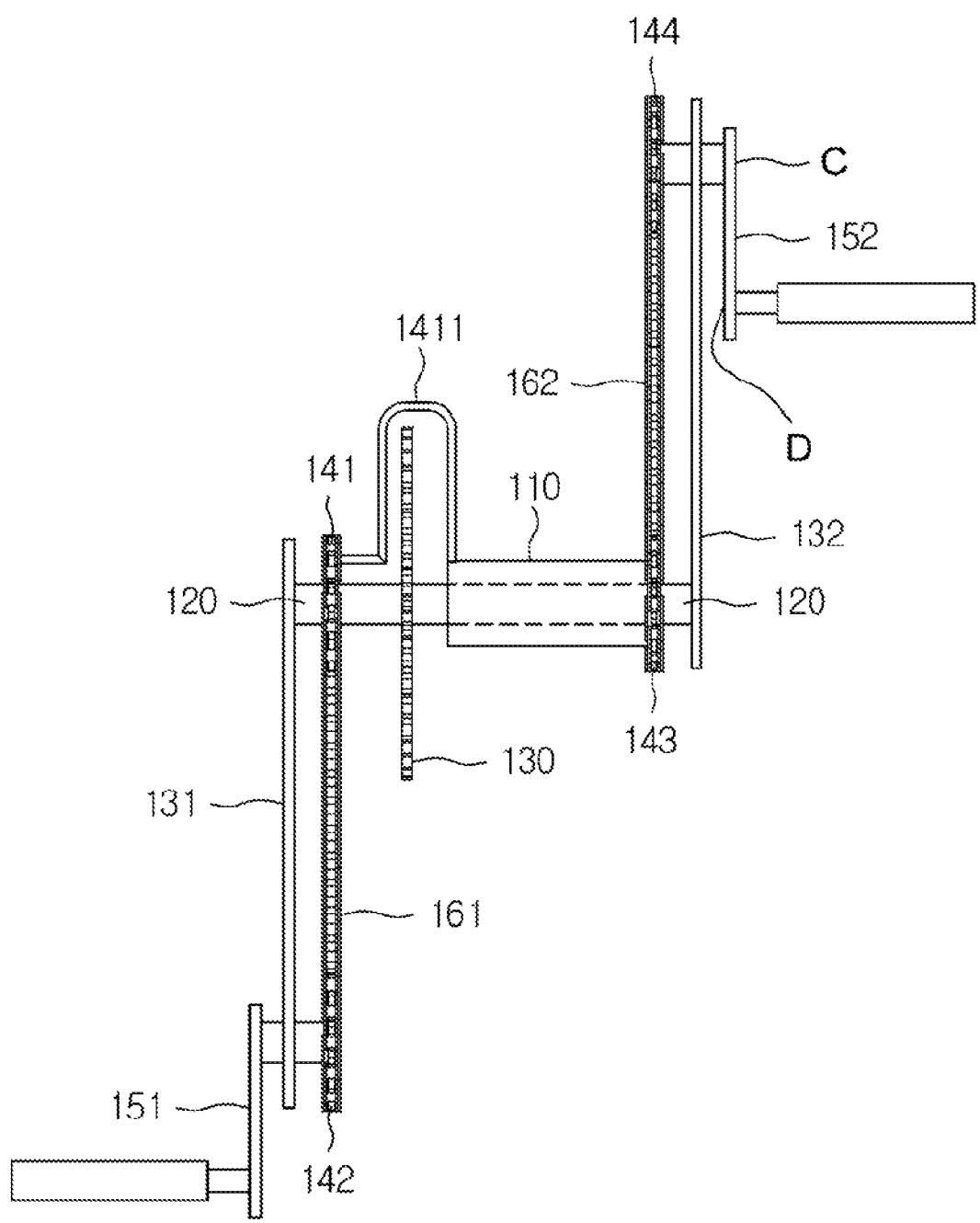

FIG. 6 provides the view of a bicycle driving device having increased torque seen in the FIG. 4 from the viewpoint A.

Figure 7:
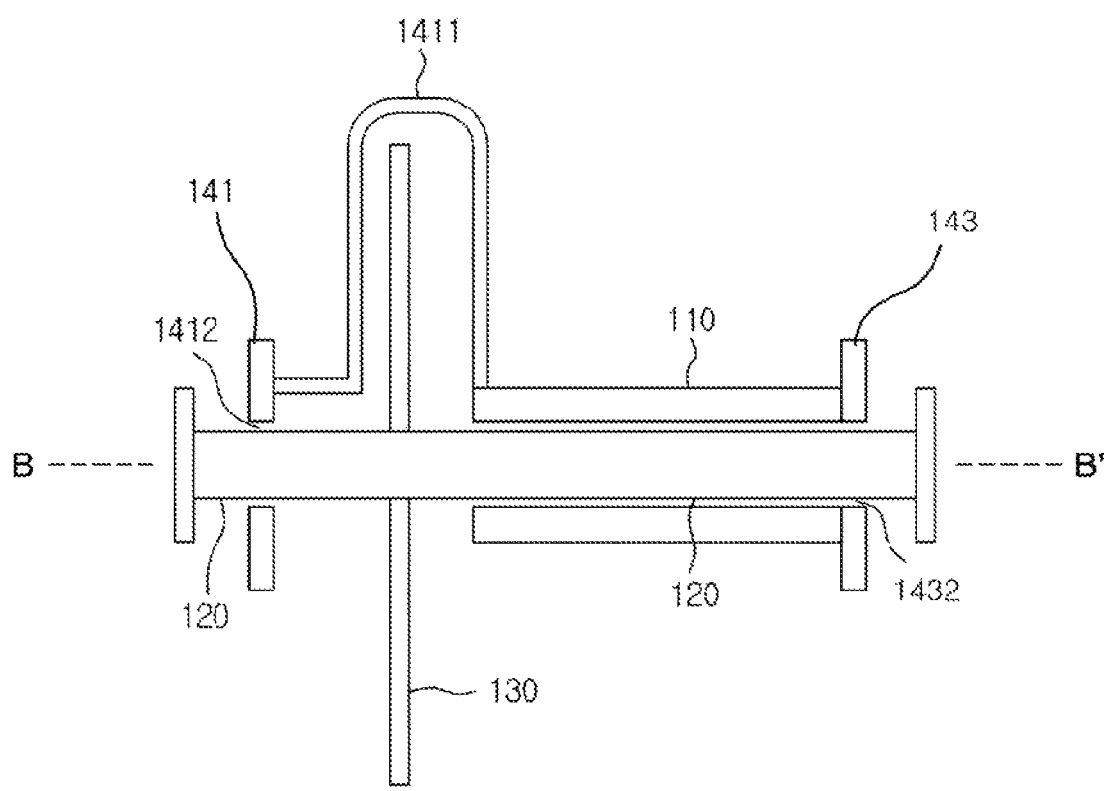

FIG. 7 provides the cross-section view of the FIG. 4 from the viewpoint B to B'.

Figure 8:
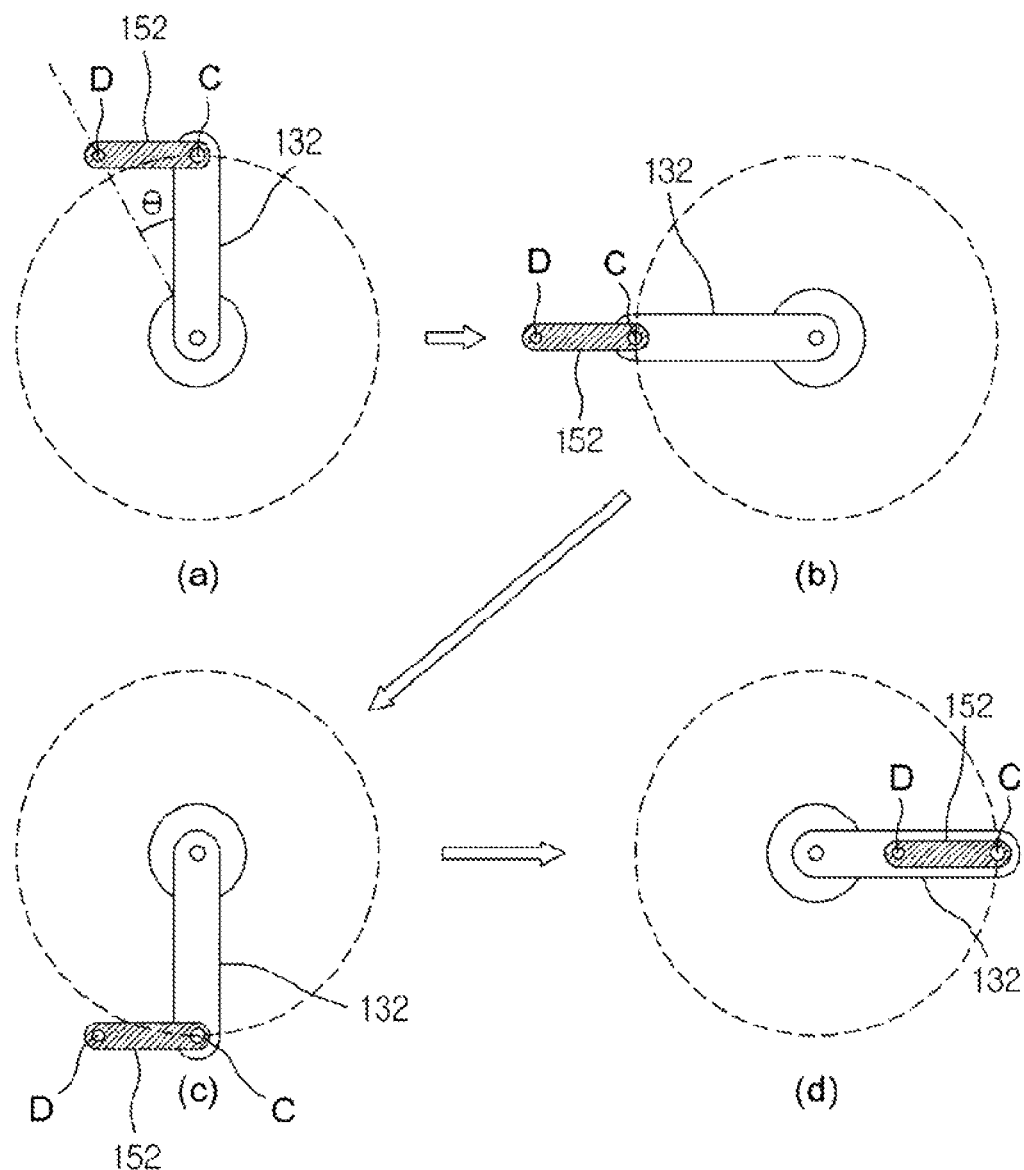

FIG. 8 provides the side view of the trajectory of the crank arm.

Figure 9:
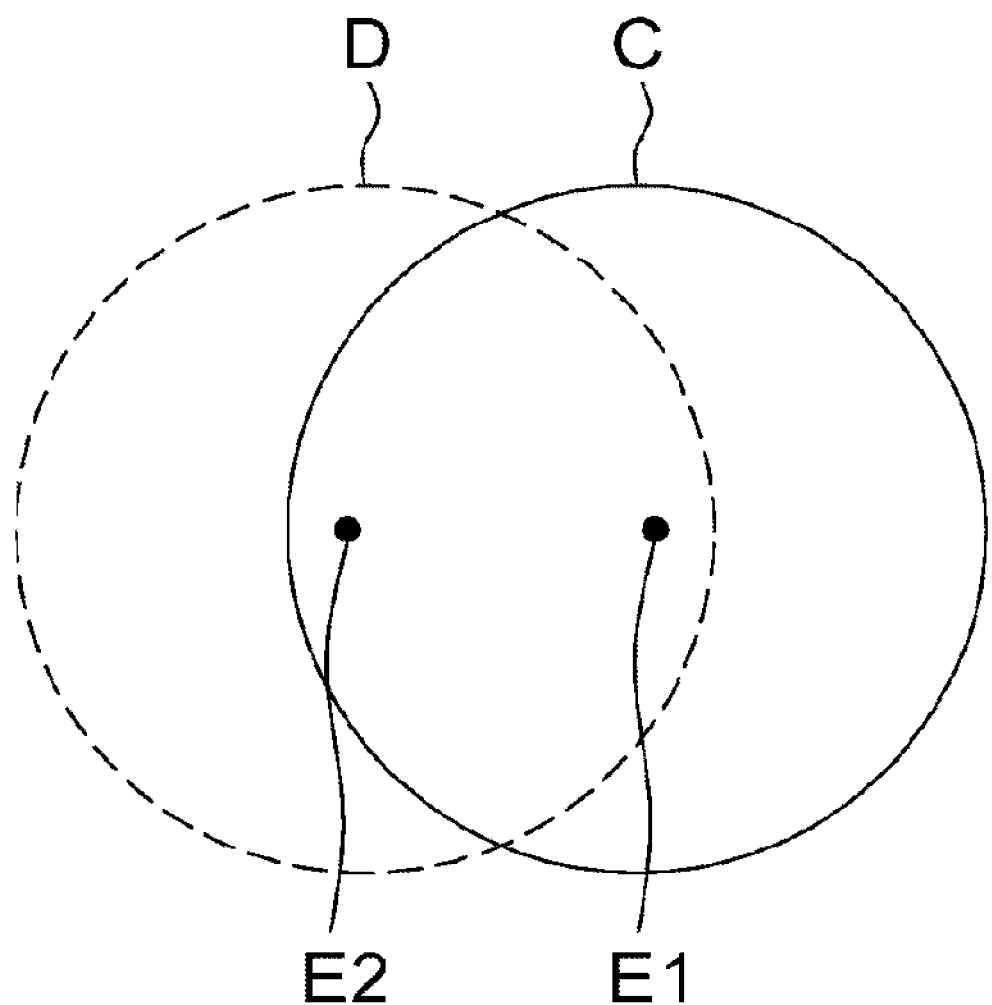

FIG. 9 provides the view of the trajectory of the crank arms at the viewpoint of C and D.

Figure 10:
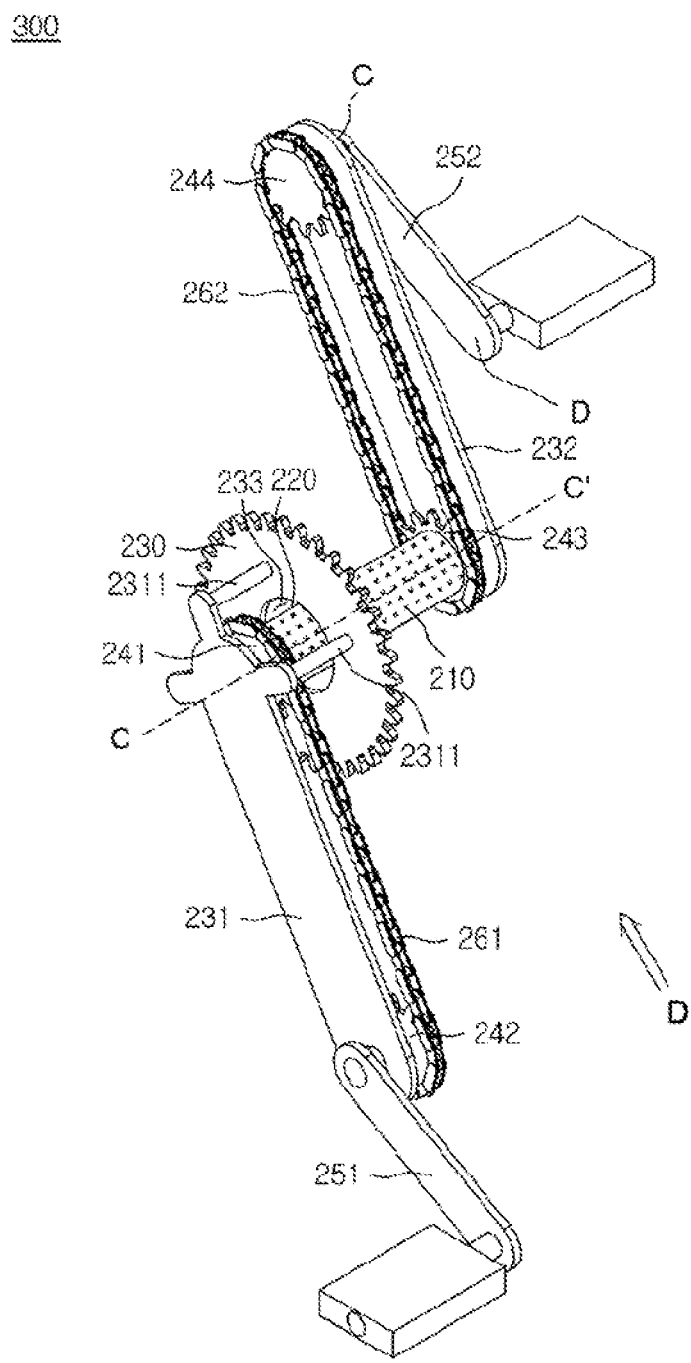

FIG. 10 provides the diagonal view of the second example of the invention of the bicycle driving device having increased torque.

Figure 11:
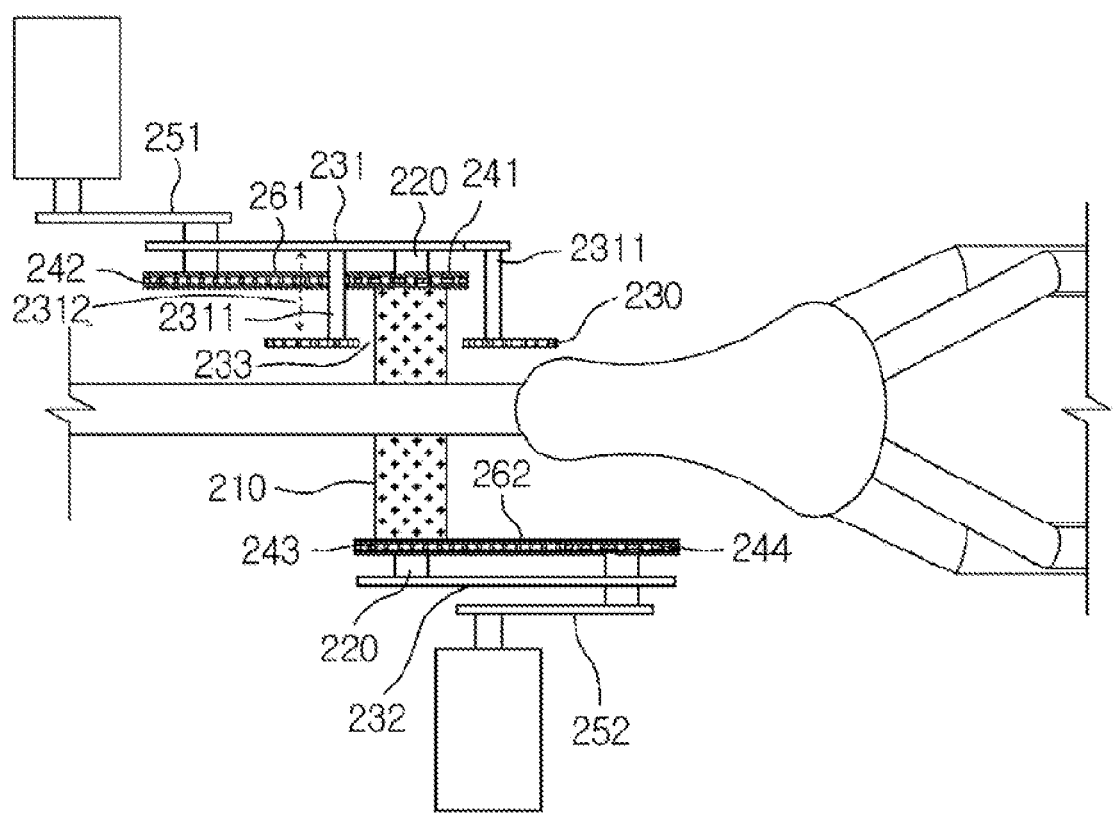

FIG. 11 provides the birds eye view of a bicycle on which the second example of the bicycle driving device having increased torque is installed.

Figure 12:
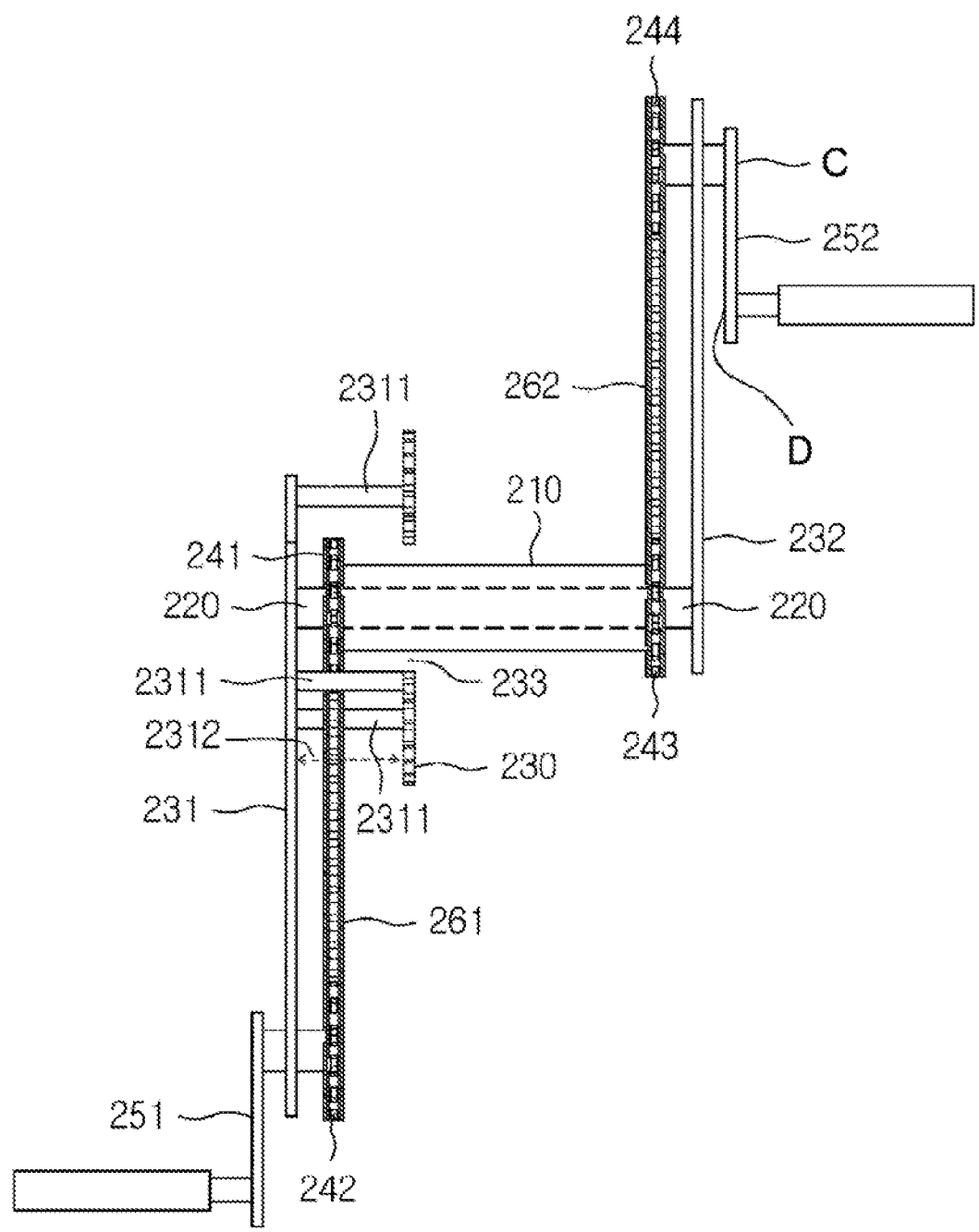

FIG. 12 provides a view of a bicycle driving device having increased torque from the viewpoint D.

Figure 13:
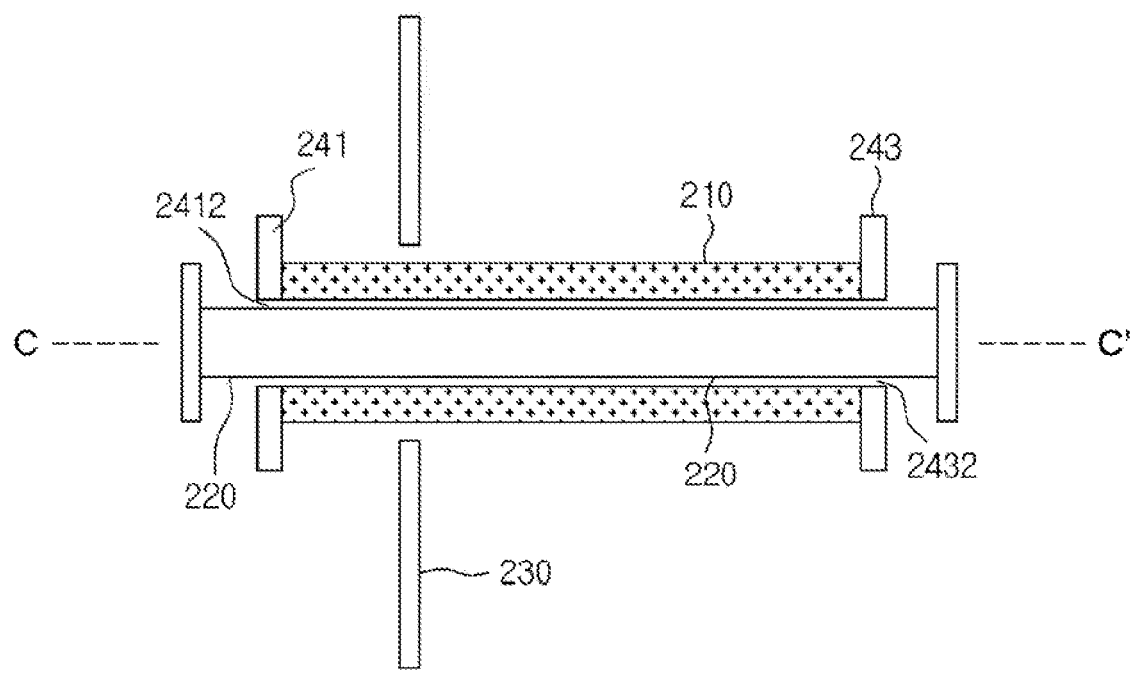

FIG. 13 provides the cross-section view of FIG. 10 from the viewpoint C to C'.

DETAILED CONTENTS TO IMPLEMENT THE INVENTION

The following section provides an explanation of an application of this invention with the references of the provided figures to the bicycle industry. This does not mean that the ideas of this invention are limited by an application.

FIG. 4 provides the diagonal view of the bicycle driving device having increased torque. FIG. 5 provides the birds eye view of the bicycle driving device having increased torque installed on a bicycle frame. FIG. 6 provides the view of the FIG. 4 from the viewpoint A. FIG. 7 provides the cross-section view of the FIG. 4 from the viewpoint B to B'. FIG. 8 provides the side view of the trajectory off the crank arm. FIG. 9 provides the view of the trajectory of the crank arms at the viewpoints of C and D.

In this example, "connecting and working together" means that the power transmission part and sprocket are connected and work together, delivering force to the crankshaft. In this case, the power transmission part can be a chain or a belt that has teeth on it. And in this case, "sprocket" can be a circular gear that can work together with a chain or a belt.

This invention of the bicycle driving device having increased torque (200) of bicycle includes the followings.

the frontal sprocket (120) that is inserted to the frame (110) and rotates;

the frontal sprocket (130) that is connected to the one side of the crankshaft (120) and rotates with the crankshaft (120);

the primary crank arm (131) that is positioned beside the frontal sprocket (130), connected to the cranks shaft (120), and rotates along with the crankshaft (120);

the primary fixed sprocket (141) being connected and fixed with the frame (110) and the holding part (1411), being located between the frontal sprocket (130) and the primary crank arm (131), having the primary hole (1412) in the center where the crankshaft is inserted and rotates, and not rotating along with the crankshaft (120);

the primary rotating sprocket (142) being connected to the tip of the primary crank arm (131), rotating on it (131) at the 1:1 ratio with the fixed sprocket (141);

the primary auxiliary crank arm (151) being connected to the tip of the primary crank arm (131) and the primary rotating sprocket (142);

the primary power transmission part (161) that connects and conveys the force from the rotating sprocket (142) to the primary fixed sprocket wheel (141);

the secondary crank arm (132) that is connected to the tip of the crankshaft (120), rotating along with the crankshaft (120);

the secondary fixed sprocket (143) being fixed on the frame (110) and having the secondary hole in the center (1432) that does not rotate, while the crankshaft (120) that goes through this secondary hole (1432) rotates;

the secondary rotating sprocket (144) being connected to the tip of the secondary crank arm (132) and rotating that has teeth at 1:1 ratio with the secondary fixed sprocket (143);

the secondary auxiliary crank arm (152) being connected to the tip of the secondary crank arm (132) and to the secondary rotating sprocket (144) and being able to rotate;

and the secondary power transmission part (162) that connect and conveys the force from the secondary rotating sprocket (144) to the secondary fixed sprocket (143).

This invention is about a drivetrain system of bicycle. In general, a bicycle consists of a frame, drivetrain system, wheels, tires, and axillary stuff.

Frame (110) is the body of a bicycle. It can be made of aluminum, steel, or carbon fiber.

A crankshaft (120) is inserted to the frame (110), rotating in the frame (110) (Reference—FIGS. 6 & 7). To decrease friction, bearings can be installed between the frame (110) and crankshaft (120). The part of the frame (110) where the crankshaft is inserted can be called a socket.

The frontal sprocket (130) is connected to the one side of the crankshaft (120) and rotates along the crankshaft (120). This frontal sprocket (130) is connected to the back sprocket by a chain, and when this frontal sprocket (130) rotates, it delivers force to the back sprocket that is connected to the rear wheel, giving driving force to the rear wheel.

The primary crank arm (131) is located on the outside of the frontal sprocket (130). The primary crank arm (131) is connected to the one side of the crankshaft (120) and rotates along this crankshaft (120).

The primary fixed sprocket (141) is connected to the frame (110) and the holding part (1411). This primary fixed sprocket (141) is located between the frontal sprocket (130) and the primary crank arm (131). As seen in the FIG. 7, the primary fixed sprocket has the primary hole (1412) in the center through which the crankshaft (120) penetrates. While this crankshaft (120) rotates, the primary fixed sprocket (141) does not rotate, because it is fixed on the frame (110). The holding part (1411) is fixed on the frame (110), and it is extended to the space where it does not disturb the circular motion of the frontal sprocket (130) and is connected to the primary fixed sprocket (141). The holding part (1411) can be installed anywhere on the frame (110). This is a suggested example, so that a spot for installation of this holding part (1411) may be various. This holding part (1411) can be also extended from the frame where the rear wheel is connected.

The primary rotating sprocket (142) is connected to the tip of the primary crank arm (131), being able to rotate on it. The primary fixed sprocket (141) and the primary rotating sprocket (142) have teeth at 1:1 ratio, so that these sprockets rotate in the same speed by being connected by the primary power transmission part (161). But the primary fixed sprocket (141) is fixed on the frame (110), so that it does not rotate, while the primary rotating sprocket (142) is connected to the tip of the primary crank arm (131) and freely rotates. The primary power transmission part (161) can be a chain.

The primary auxiliary crank arm (151) is connected on the tip of the primary crank arm (131) and can freely rotate. This primary auxiliary crank arm (151) is fixed to the primary rotating sprocket (142) and rotates together.

When the primary crank arm (131) rotates one turn on the crankshaft (120) which is the pivot, the primary power transmission part (161) and the primary fixed sprocket (141) held by the primary power transmission part (161) are connect and move together as much as the one turn of the primary fixed sprocket (141). The primary rotating sprocket (142) rotates as much as the primary power transmission part (161) moves. The primary power transmission part (161) and the primary fixed sprocket (141) are connected and work together as much as one turn, so that the primary rotating sprocket (142) and chain are connected and work together as much as one turn of the primary rotating sprocket (142).

As a result, the circular movement of the primary auxiliary crank arm (151) and the primary crank arm (131) is achieved as seen in the FIGS. 8 and 9. Also, the secondary auxiliary crank arm (152) and the secondary crank arm (132) move in the same trajectory. The FIGS. 8 and 9 show the trajectory at the point C and the point D.

The key component of this drivetrain system is the fact that the primary fixed sprocket (141) must be fixed on the frame, so that it must not rotate. Also, this primary fixed sprocket (141) must have teeth at 1:1 ratio along with the primary rotating sprocket (142), and these two sprockets (141 & 142) are connected and work together by the primary power transmission part (161).

Likewise, the secondary fixed sprocket (143) is fixed on the frame (110). This secondary fixed sprocket (143) has teeth at 1:1 ratio along with the secondary rotating sprocket (144), and these two sprockets (141 & 142) are connected by the secondary power transmission part (162).

The secondary crank arm (132) is connected on the other side of the tip of the crankshaft (120), rotating along with the crankshaft (120). The primary crank arm (131) and the secondary crank arm (132) are symmetrically arranged in 180 degree.

As seen in the FIG. 7, the secondary fixed sprocket (143) is fixed on the frame (110). This secondary fixed sprocket (143) has the secondary hole (1432) in the center. The crankshaft (120) penetrates this secondary hole (1432), and this secondary fixed sprocket (143) does not rotate, while the crankshaft (120).

The secondary rotating sprocket (144) is connected to the tip of the secondary crank arm (132), being able to rotate on it. The secondary fixed sprocket (143) and the secondary rotating sprocket (144) have teeth at 1:1 ratio, so that these sprockets rotate in the same speed by being connected by the secondary power transmission part (162) which may be a chain. While the secondary crank arm(132) rotates one turn, the secondary rotating sprocket (144) rotates also one turn by the force delivered by the secondary power transmission part (162) and this secondary power transmission part (162) delivers the force at 1:1 ratio due to the teeth on the sprockets (143 & 144). The FIG. 8 shows the fact that the secondary auxiliary crank arm (152) and the secondary crank arm (132) work together. And the FIG. 9 shows the trajectory at the point C and point D.

C is the point of the conventional drivetrain system of bicycle where the pedal is connected, and it has a circular trajectory. In the FIG. 9, E1 is the center point of the trajectory of the conventional drivetrain system of bicycle where the crankshaft (120) is located. The FIG. 8(*a*) shows the critical fact that the force from the rider cannot be exerted from the point C, since it is the top-dead center. However, this invention enables for a pedal to be located at the point D seen in the FIG. 8(*a*) and moved forward as much as the angle θ, so that it makes possible to exert force to the crankshaft (120) at the top-dead center.

The FIG. 8(*b*) show the point where the most force can be exerted. On the conventional drivetrain system, the rider starts to exert the force from the point C. But this invention makes a pedal located at the point D, so that the length of the crank arm can be extended as much as the length of the secondary auxiliary crank arm (152). As a result, more force can be exerted to the crankshaft (120) with the same amount of force.

The FIG. 9 shows that the trajectories at the point C and D have same radius. The center point of the trajectory of C is E1 and the center of the trajectory of D is E2. This means that the center point of the trajectory of the crank arm is moved from E1 to E2. And yet, the radius of C and D is same. In other words, E1 where the crankshaft (120) is located is the point where the crank arm is connected to the crankshaft in the conventional system. But this new drive system enables to move the center point of the trajectory to E2 as much as the length of the secondary auxiliary crank arm (152).

This means that the invention of this new drivetrain system gets rid of the top-dead center where force cannot be applied and moves the center point of the trajectory forward, while it does not increase the trajectory much. As a result, this system enables to deliver more power to the crankshaft (120).

In this first example of the new drivetrain system mentioned above, the holding part (1411) connects and fixes the frame (110) and the primary fixed sprocket (141) together. To prevent interfering the frontal sprocket (130), this holding bracket (1411) has a bent shape. The disadvantage of this holding part (1411) is that it does not have structural durability much and it does not provide a sleek look. Another issue is that more than one holding bracket are needed to fix the primary fixed sprocket (141).

The second example of the bicycle driving device having increased torque (300) solves the issues like the following.

FIG. 10 provides the diagonal view of the second example of the bicycle driving device having increased torque. FIG. 11 provides the birds eye view of a bicycle on which the bicycle driving device having increased torque is installed. FIG. 12 provides a view of the new drivetrain system from the viewpoint D. FIG. 13 provides the cross-section view of FIG. 10 from the viewpoint C to C'.

This example of the new bicycle driving device having increased torque (300) includes the followings.

the crankshaft (220) going through the center of the socket (210) and being able to rotate;

the frontal sprocket hole (233) through which the socket (210) penetrates is formed, and the frontal sprocket (230) that does not contact and interfere the inner surface of the frontal sprocket hole (233);

the primary crank arm (231) that is located the outside of the frontal sprocket (230), is connected to one side of the crankshaft (220), and rotates along with this crankshaft (220);

the bridge (2311) that forms a space between the frontal sprocket (230) and the first crank arm (231);

the primary fixed sprocket (241) that is connected to the one side of the socket (210), that is located between the frontal sprocket (230) and the primary crank arm (231), that has the primary hole (2412) in the center where the crankshaft (220) goes through, and that does not rotate along with the crankshaft (220), while the crankshaft (220) rotates;

the primary rotating sprocket (242) that has teeth at 1:1 ratio along with the primary fixed sprocket (241), that is connected on the tip of the primary crank arm (231), and that can rotate;

the primary auxiliary crank arm (251) that is connected to the tip of the primary crank arm and that is fixed with the primary rotating sprocket (242) and rotates along with the primary rotating sprocket (242);

the primary power transmission part that goes through the space (2312), connects the primary fixed sprocket (241) and the primary rotating sprocket (242), and conveys the power;

the secondary crank arm (232) that is connected to the tip of the other side of the crankshaft (220) and rotates along this crankshaft (220);

the secondary fixed sprocket (243) that is connected and fixed to the socket (210), that has the secondary hole (2432) through which the crankshaft penetrates, and that does not rotate along with the crankshaft (220);

the secondary rotating sprocket (244) that is connected to the tip of the secondary crank arm (232), rotates, and has teeth at 1:1 ratio along with the secondary fixed sprocket (243);

the secondary auxiliary crank arm (252) that is connected on the tip of the secondary crank arm (232), is fixed with the secondary rotating sprocket (244), and rotates along with this secondary rotating sprocket (244);

and the secondary power transmission part (262) that connects the secondary fixed sprocket (243) and the secondary rotating sprocket (244), transmitting the power.

The crankshaft (220) is inserted into the center of the socket (210), sitting in this socket (210), being able to rotate in this socket (210) as seen in the FIG. 13.

The FIG. 11 shows that the frontal sprocket (230) has the frontal sprocket hole (233) through which the one side of the socket (210) penetrates. The socket (210) does not have any contact with the inner surface of the frontal sprocket hole (233).

In this first example, the frontal sprocket (130) is directly connected to the crankshaft (130). But in the second example, the frontal sprocket (230) is connected to the primary crank arm (231) via the bridge (2311), so that the primary crank arm (231) and the frontal sprocket (230) rotate together.

The primary crank arm (231) is located at the outside of the frontal sprocket (230). The primary crank arm (231) is connected to the one side of the crankshaft (220). As the primary crank arm (231) rotates, the crankshaft (220) also rotates. Also, along with these, the frontal sprocket (230) that is connected via the primary crank arm (231) and the bridge (2311) rotates together.

The bridge (2311) connects the primary crank arm (231) and the frontal sprocket (230), while this bridge (2311) makes a gap between the primary crank arm (231) and the frontal sprocket (230). In this gap (2312), the primary power transmission part (261) is connected on the primary rotating sprocket (242) that is on the tip of the primary crank arm (231).

The primary fixed sprocket (241) is fixed on the one side of the socket (210) and is located between the frontal sprocket (230) and the primary crank arm (231). The primary fixed sprocket (241) is fixed and does not rotate, while the crankshaft (220) rotates.

The primary rotating sprocket (242) is connected on the tip of the primary crank arm (231), has teeth at 1:1 ratio along with the primary fixed sprocket (241), and can freely rotate.

(112) The primary auxiliary crank arm (251) is connected on the tip of the primary crank arm (231) and can freely rotate. This primary auxiliary crank arm (251) is fixed to the primary rotating sprocket (242) and rotates together. The primary power transmission part (261) goes through the space (2312), connects the primary fixed sprocket (241) and the primary rotating sprocket (242), and conveys the power.

The FIG. 10 shows that when the frontal sprocket (230) and the primary crank arm (131) are connected by the bridge (2311), and it forms a very stable structure to compare with the primary example of the new drivetrain system.

The secondary crank arm (232) is connected on the other side of the tip of the crankshaft (220), rotating along with the crankshaft (220).

The secondary fixed sprocket (243) is fixed on the socket (210), has the secondary hole (2432) in the center through which the crankshaft (220) penetrates, and does not rotate along with the crankshaft (220), since it is fixed on the socket (210).

The secondary rotating sprocket (244) is connected to the tip of the secondary crank arm (232), being able to rotate on it. The secondary rotating sprocket (244) and the secondary fixed sprocket (243) have teeth at 1:1 ratio.

The secondary auxiliary crank arm (252) is connected on the tip of the secondary crank arm (232) and can freely rotate. It is fixed with the secondary rotating sprocket (244) and rotates together.

The secondary power transmission part (262) connects the secondary fixed sprocket (243) and the secondary rotating sprocket (244) together, transmitting power.

The above is an explanation of an application of this invention. And this does not mean that the idea of this invention is limited within this suggestion. This invention has the right for any modification or addition to the bicycle driving device having increased torque.

POSSIBILITY OF INDUSTRIAL USE

The present invention can be applied to a power transmission system for increasing rotational torque.

What is claimed is:

1. A bicycle driving device having increased torque comprising:
   a frontal crankshaft (120) rotatably coupled to a frame (110);
   a frontal sprocket (130) coupled to the one side of the crank shaft (120), wherein the crankshaft (120) rotates together;
   a primary crank arm (131) positioned outside of said frontal sprocket (130), and coupled to one side of the crank shaft (120) to rotate together when the crank shaft (120) rotates;
   a primary fixed sprocket (141) coupled via the frame (110) and a holding arm part (1411), is located between the frontal sprocket (130) and the primary crank arm (131), has a primary hole (1412) in the central part where the crankshaft (120) is inserted and rotates, and is fixed even when the crankshaft (120) rotates;
   a primary rotating sprocket (142) rotatably coupled to an end of the primary crank arm (131) and having teeth formed at the 1:1 ratio with the primary fixed sprocket (141);
   a primary auxiliary crank arm (151) rotatably coupled to an end of the primary crank arm (131) and fixed to the primary rotating sprocket (142) to rotate together;
   a pedal(14a) rotatably coupled the primary auxiliary crank arm(151);
   a primary power transmission part (161) connecting the primary fixed sprocket (141) and the primary rotating sprocket (142) to transmit power;
   a secondary crank arm (132) coupled to the other end of the crankshaft (120) and rotating together when the crankshaft (120) rotates;
   a secondary fixed sprocket (143) coupled to the frame (110) with the secondary hole (1432) in the central part that does not rotate while the crankshaft (120) penetrated through the secondary hole (1432) and rotates;
   a secondary rotating sprocket (144) rotatably coupled to an end of the secondary crank arm (132) and having teeth formed at 1:1 ratio with the secondary fixed sprocket (143);
   a secondary auxiliary crank arm (152) rotatably coupled to an end of the secondary crank arm (132) and fixed to the secondary rotating sprocket (144) to rotate together;
   a pedal(14b) rotatably coupled the secondary auxiliary crank arm(152), and
   a secondary power transmission part (162) for transmitting power by connecting the second fixed sprocket (143) and the second rotating sprocket (144).

2. The bicycle driving device according to claim 1, wherein the primary power transmission part (161) and the secondary power transmission part (162) are chains.

3. A bicycle driving device having increased torque comprising:
   a crankshaft (220) rotatably coupled through a central part of the socket (210);
   a frontal sprocket (230) including a frontal sprocket hole (233) formed at a center thereof so that one side of the socket (210) can penetrate and not contact with the socket (210);
   a primary crank arm (231) positioned outside the frontal sprocket (230) and coupled to one side of the crankshaft (220) to rotate together when the crank shaft (220) rotates;
   a bridge (2311) connecting the primary crank arm (231) and the frontal sprocket 230 so that a space (2312) is formed;
   a primary fixed sprocket (241) fixed to the one side of the socket (210), is located between the frontal sprocket (230) and the primary crank arm (231), that has a primary hole (2412) in the central part where the crank shaft (220) is penetrating, and is fixed even when the crankshaft (220) rotates;
   a primary rotating sprocket (242) rotatably coupled to an end of the primary crank arm (231) and having teeth formed at a ratio of 1:1 ratio with the primary fixed sprocket (241);
   a primary auxiliary crank arm (251) rotatably coupled to an end of the primary crank arm and fixed to the primary rotating sprocket (242) to rotate together;
   a pedal(14a) rotatably coupled the primary auxiliary crank arm(251);
   a primary power transmission part (261) which transmits power by connecting the primary fixed sprocket (241) and the primary rotating sprocket (242) through the space (2312);
   a secondary crank arm (232) coupled to the other end of the crankshaft (220) rotating together when the crankshaft (220) rotates;
   a secondary fixed sprocket (243) fixedly coupled to the socket (210) with secondary hole (2432) in the central part that does not rotate while the crankshaft (220) penetrated though the secondary hole(2432), and rotates;
   a secondary rotating sprocket 244 rotatably coupled to an end of the secondary crank arm (232) and having teeth formed at a ratio of 1:1 with the secondary fixed sprocket (243);
   a secondary auxiliary crank arm (252) rotatably coupled to an end of the secondary crank arm (232) and fixed to the secondary rotating sprocket (244) to rotate together;

a pedal(14*b*) rotatably coupled the secondary auxiliary crank arm(152); and a secondary power transmission part (262) for transmitting power by connecting the secondary fixed sprocket (243) and the secondary rotating sprocket (244).

4. The bicycle driving device according to claim 3, wherein the primary power transmission part (261) and the secondary power transmission part (262) are chains.

* * * * *